United States Patent [19]
Schueman

[11] Patent Number: 5,451,069
[45] Date of Patent: Sep. 19, 1995

[54] AIR POWERED ACTUATOR FOR RETRACTING THE LOCKING PINS OF A SLIDER

[75] Inventor: Gerald L. Schueman, Oakland, Iowa

[73] Assignee: Schueman Transfer, Inc., Oakland, Iowa

[21] Appl. No.: 238,636

[22] Filed: May 5, 1994

Related U.S. Application Data

[63] Continuation-in-part of Ser. No. 195,852, Feb. 10, 1994.

[51] Int. Cl.⁶ ............................................... B60G 5/00
[52] U.S. Cl. .............................. 280/149.2; 280/405.1; 180/209
[58] Field of Search ................... 180/209, 24.01, 24.02; 280/149.2, 405.1

[56] References Cited

U.S. PATENT DOCUMENTS

| | | | |
|---|---|---|---|
| 2,935,332 | 5/1960 | Delay | 280/81 |
| 2,976,051 | 3/1961 | Morey | 280/81 |
| 3,146,000 | 8/1964 | Holzman | 280/81 |
| 3,365,211 | 1/1968 | Ginsburg | 280/81 |
| 3,372,946 | 3/1968 | Hutchens | 280/81 |
| 3,778,079 | 12/1973 | Vornberger et al. | 280/80 B |
| 4,286,797 | 9/1981 | Mekosh, Jr. et al. | 280/149.2 |
| 4,635,742 | 1/1987 | Bertolini | 180/209 |
| 4,838,566 | 6/1989 | Baxter et al. | 280/149.2 |
| 4,838,578 | 6/1989 | Baxter | 280/149.2 |
| 4,944,522 | 7/1990 | Hart | 280/149.2 |
| 4,993,737 | 2/1991 | Torcomian | 280/149.2 X |
| 5,137,296 | 8/1992 | Forman | 180/209 X |
| 5,199,732 | 4/1993 | Lands et al. | 180/209 X |
| 5,232,234 | 8/1993 | McConds | 280/149.2 X |
| 5,314,201 | 5/1994 | Wassels | 280/209 X |
| 5,346,233 | 9/1994 | Moser | 280/149.2 |

Primary Examiner—Kenneth R. Rice
Assistant Examiner—Christopher P. Ellis
Attorney, Agent, or Firm—Zarley, McKee, Thomte Voorhees & Sease; Dennis L. Thomte

[57] ABSTRACT

An air powered actuator is provided for exerting sufficient force on the locking pins of a slider for the adjustment of the suspension of a vehicle longitudinally with respect to the body of the vehicle. The air powered actuator is controlled from the cab of the vehicle.

9 Claims, 5 Drawing Sheets

AIR POWERED ACTUATOR FOR RETRACTING THE LOCKING PINS OF A SLIDER

CROSS-REFERENCE TO RELATED APPLICATION

This is a continuation-in-part application of application Ser. No. 08/195,852 filed Feb. 10, 1994 pending.

BACKGROUND OF THE INVENTION

1. Field of the Invention

This invention relates generally to a slider which is used to adjust the suspension of a vehicle longitudinally with respect to the body of the vehicle, and more particularly to an air powered actuator for retracting the locking pins of the slider.

2. Background of the Invention

Sliders are commonly used to enable longitudinal adjustment of the suspension of a tandem axle trailer relative to the van or body of the trailer. Conventional sliders normally comprise a pair of side rails which are secured to the left and right sides of the van and which extend longitudinally therealong the underside thereof. The suspension of the trailer is carried by a frame which includes left and right slide members which are slidably mounted with respect to the side rails of the van. A plurality of locking pins lock the frame in various positions with respect to the side rails. When it is desired to adjust the suspension of the trailer with respect to the body, the locking pins are retracted to permit the frame to slide with respect to the side rails of the van. However, if the vehicle is not sitting on perfectly level ground, the locking pins may be difficult to pull from their registering openings in the frame and the side rails of the body. Heretofore, the normal procedure for freeing the locking pins was to have one person pull on the actuating arm connected to the locking pins while the driver attempted to jiggle or jog the trailer with respect to the tandem axle, which had been previously locked in place with the air powered emergency brake. The above solution was not satisfactory and an effort to solve the problem is disclosed in U.S. Pat. No. 4,838,566. Although it is believed that the device of the '566 patent alleviates the above-described problem, it is believed that the instant device represents a significant improvement thereover.

In applicant's co-pending application, an improved device is disclosed which is ideally suited for the types of sliders such as illustrated in U.S. Pat. No. 4,838,566 and applicant's patent drawings. However, not all of the sliders on the market are of the same construction. The instant invention is ideally suited for use with those sliders which have only a pair of locking pins which are conjointly retracted and extended by a linkage connected to the two locking pins.

SUMMARY OF THE INVENTION

The invention described herein comprises an air powered actuator which is operatively connected to the locking pins of a slider so that air pressure may be utilized to pull the locking pins from their registering openings in the frame and the side rails of the trailer. In operation, when it is desired to longitudinally adjust the suspension of the trailer with respect to the trailer body, the emergency brake for the tandem axle is first set or activated. The air powered actuator is then actuated which exerts sufficient retracting force on the locking pins to pull the locking pins from their registering openings in the frame and the side rails of the trailer. The air powered actuator disclosed in this invention comprises a linkage which is operatively pivotally connected to the first and second locking pins of the slider. When the air powered actuator is extended, the first and second locking pins are retracted. When the air powered actuator is deactivated, the locking pins move from their extended position to their retracted position.

It is therefore a principal object of the invention to provide an improved slider for adjustment of the suspension of a trailer longitudinally with respect to the body of the trailer.

A further object of the invention is to provide an air powered actuator for retracting the locking pins of a slider.

A further object of the invention is to provide an invention of the type described above which may be easily connected to the conventional slider adjustment actuator without extensive modification thereof.

Still another object of the invention is to provide a device of the type described above which is safe to use.

Still another object of the invention is to provide a device of the type described above which is convenient to use.

Still another object of the invention is to provide an invention of the type described above which is economical of manufacture and easy to install.

These and other objects will be apparent to those skilled in the art.

DESCRIPTION OF THE PREFERRED EMBODIMENT

Figure 1:
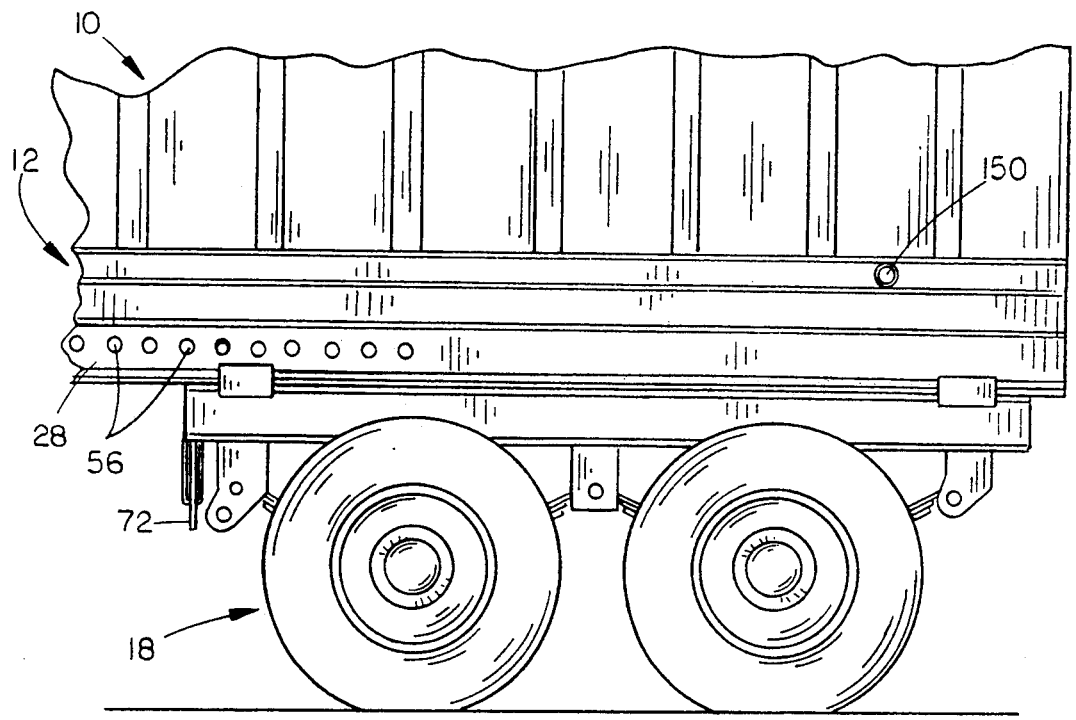
FIG. 1 is a partial side view of the suspension system of a trailer having a tandem axle.

The numeral 10 refers generally to a trailer which is conventionally pulled by a truck or tractor having a fifth wheel connection thereto. Trailer 10 includes a frame 12 having a plurality of transversely extending cross frame members 14 extending between the sides thereof. A slider 16 is secured to the underside of the cross frame members 14 near the rear end of the trailer 10. The numeral 18 refers to a tandem axle suspension which is operatively connected to the slider 16 for movement longitudinally therewith with respect to the trailer 10.

Figure 4:
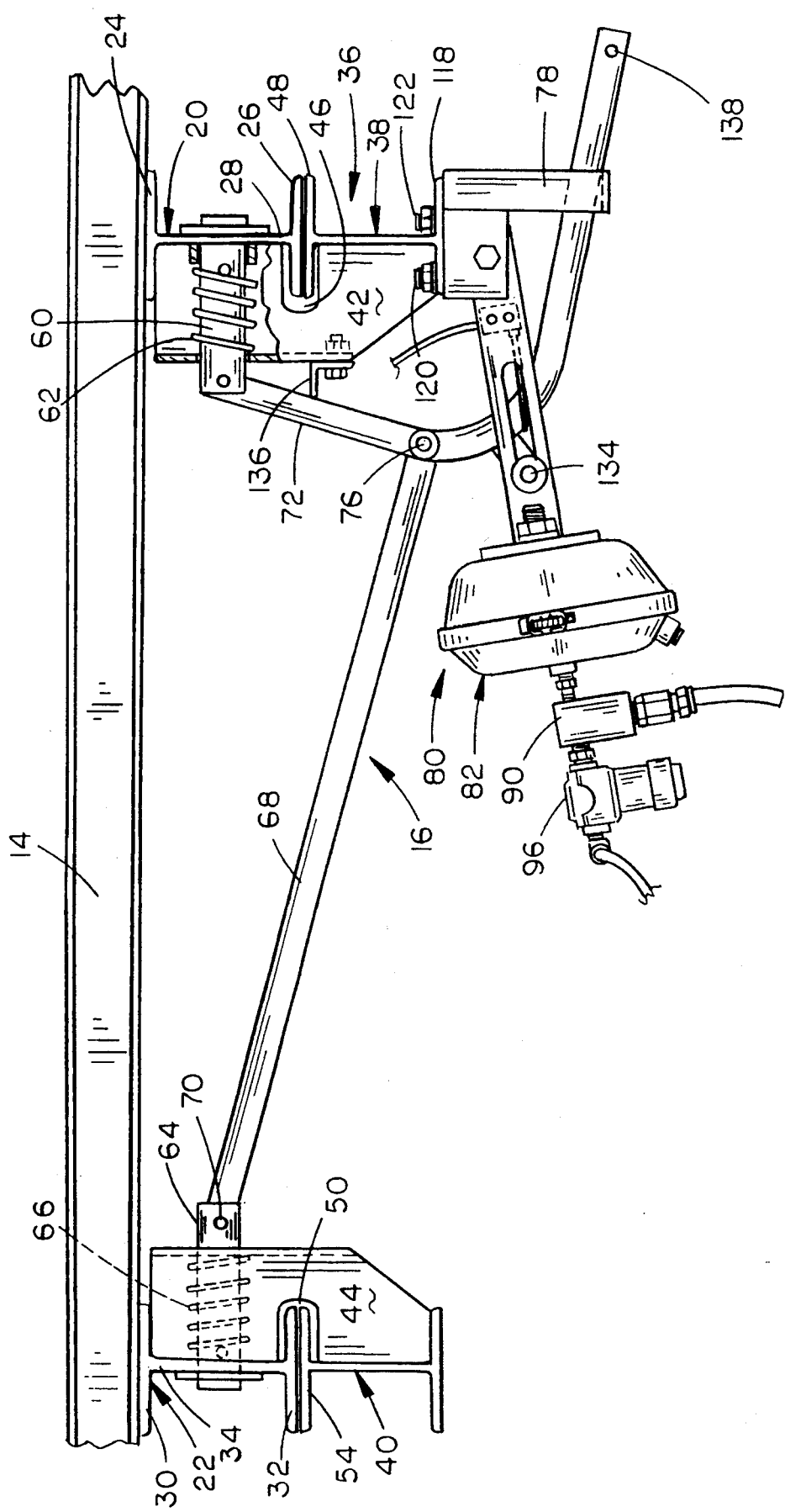
FIG. 4 is a partial front view of the slider adjustment assembly and the air powered actuator of this invention.

Slider 16 includes a pair of side rails 20 and 22 which are secured to the underside of the cross frame members 14. Side rail 20 is generally I-shaped and includes a top flange 24, bottom flange 26 and a substantially vertically disposed web 28 interconnecting flanges 24 and 26. As seen in FIG. 4, side rail 22 includes top flange 30, bottom flange 32 and a substantially vertically disposed web 34 which interconnects the flanges 30 and 32.

Figure 2:
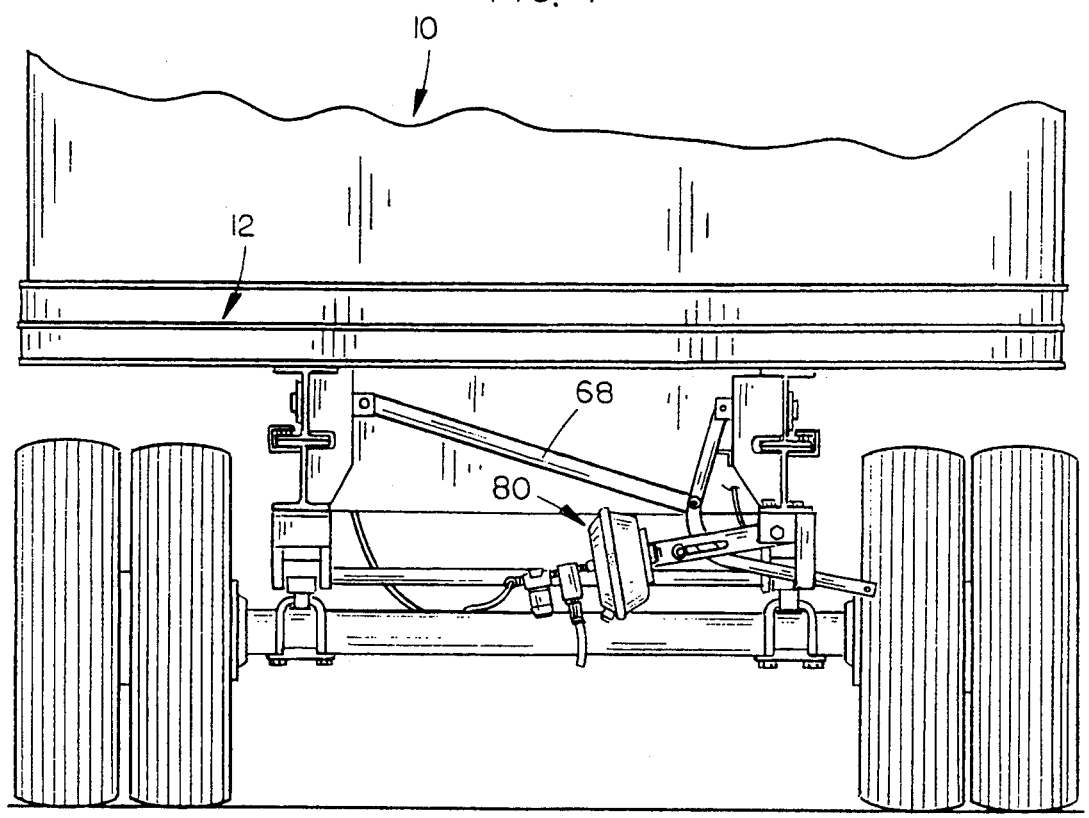
FIG. 2 is a front view of the trailer of FIG. 1.

Slider 16 also includes a frame, generally indicated by the reference numeral 36 in FIG. 2, which carries the suspension of the tandem axle and which includes left and right slide members 38 and 40 respectively. The slide members 38 and 40 are slidable longitudinally of the van or trailer on the side rails 20 and 22 respectively. As is best illustrated in FIG. 4, each of the slide members 38 and 40 are generally -shaped in section. Slide members 38 and 40 include frame members 42 and 44 which are secured thereto respectively and which extend upwardly therefrom as best illustrated in FIG. 4. Frame member 42 includes an opening 46 which receives the inner end of flange 26 and the inner end of the flange 48. Similarly, frame member 44 includes an opening 50 which receives the inner end of flange 32 and the inner end of flange 54.

Web 28 of side rail 20 is provided with a plurality of horizontally spaced openings 56 while side rail 22 is provided with a plurality of horizontally spaced-apart openings 58 extending therethrough. Locking pin 60 is slidably mounted in frame member 36 as illustrated in FIG. 4 and includes a spring 62 mounted thereon for yieldably urging the locking pin 60 to the extended and locked position illustrated in FIG. 4. When the locking pin 60 is in its extended position, it extends through one of the openings 56 in side rail 20. Similarly, locking pin 64 is slidably mounted in frame member 44 and includes a spring 66 mounted thereon for urging the locking pin 64 towards its extended and locked position illustrated in FIG. 4. When the locking pin 64 is in its extended and locked position, the outer end of the locking pin 64 extends through one of the openings 58.

The numeral 68 refers to an elongated link which is pivotally connected to the inner end of locking pin 64 by pin 70. The numeral 72 refers to an elongated and arcuate link 72 which is pivotally connected at its upper end to locking pin 60 by pin 74. Link 68 is pivotally connected to link 72 by pin 76. The outer lower end of link 72 extends outwardly through a support 78 which is operatively secured to the slide rail 38 as illustrated in FIG. 4. The slider mechanism described to this point is conventional in design and is the type of slider mechanism that is sometimes found on Fruehauf trailers.

For purposes of description, the air powered actuator of this invention is referred to generally by the reference numeral 80. It should be noted that although the air powered actuator 80, which will now be described, is ideally suited for use with the slider illustrated therein, the air powered actuator 80 of this invention may be easily adapted for use with any slider employing retractable locking pins. For example, the air powered actuator of this invention could easily be modified to operate the locking pins disclosed in U.S. Pat. Nos. 2,935,332; 2,978,051; 3,146,000; 3,365,211; 3,372,946; 3,778,079; or 4,838,578. Air powered actuator 80 includes a conventional pressure cylinder or canister 82 of conventional design having a rod 84 extending from one side of the housing 86. The inner end of rod 84 is connected to a movable diaphragm which separates the cylinder 82 into two compartments in conventional fashion.

Figure 3:
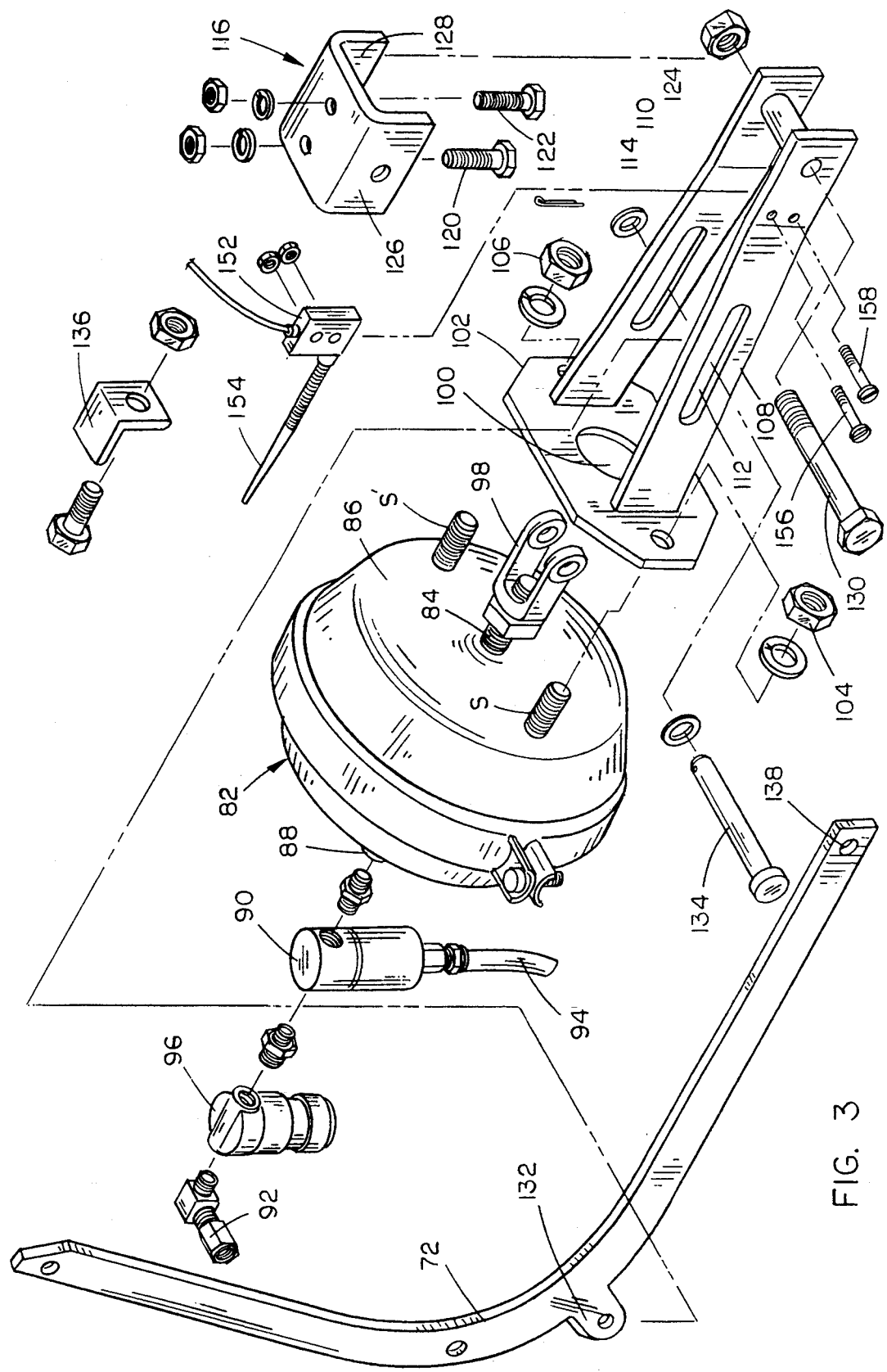
FIG. 3 is an exploded perspective view of the air powered actuator of this invention.

Threaded studs S and S' extend from one side of housing 86 as illustrated in FIG. 3. Housing 86 has an air inlet 88 which has an electrical solenoid air valve 90 secured thereto. The numeral 92 refers to a fitting which is in communication with an air line 94 which is in communication with a source of air pressure. Fitting 92 is connected to an air regulator 96 which is operatively connected to the air valve 90. Air valve 90 is provided with an exhaust port 94 for a purpose to be described in more detail hereinafter.

When air under pressure is supplied to the housing 86, the rod 84 is extended therefrom in conventional fashion. Preferably, the pressure cylinder 82 is of the type which is normally associated with vehicle air brakes and which has a diaphragm provided therein which separates the housing 86 into two chambers as previously stated. Although it is preferred that the pressure cylinder or air brake 82 be utilized, the pressure cylinder 82 could be replaced by any suitable fluid cylinder, fluid motor, etc., wherein a movable rod, similar to rod 84, movably extends therefrom when air or fluid pressure is supplied to the device.

Rod 84 has a clevis 98 mounted thereon which extends through opening 100 in bracket 102 which is secured to the studs S and S' of housing 86 by nuts 104 and 106 respectively. Bracket 102 includes a pair of spaced-apart arms 108 and 110 having elongated slots 112 and 114 formed therein respectively. The ends of the arms 108 and 110 are secured to bracket 116. Bracket 116 defines an inverted U-shape and is secured to the underside of flange 118 of slide member 38 by means of bolts 120 and 122 as seen in FIG. 4. The outer ends of arms 108 and 110 are provided with a collar or bushing 124 extending therebetween as illustrated in FIG. 3. The outer ends of the arms 108 and 110 are received between the legs 126 and 128 of bracket 116 and are pivotally secured thereto by means of bolt 130.

Figure 7:
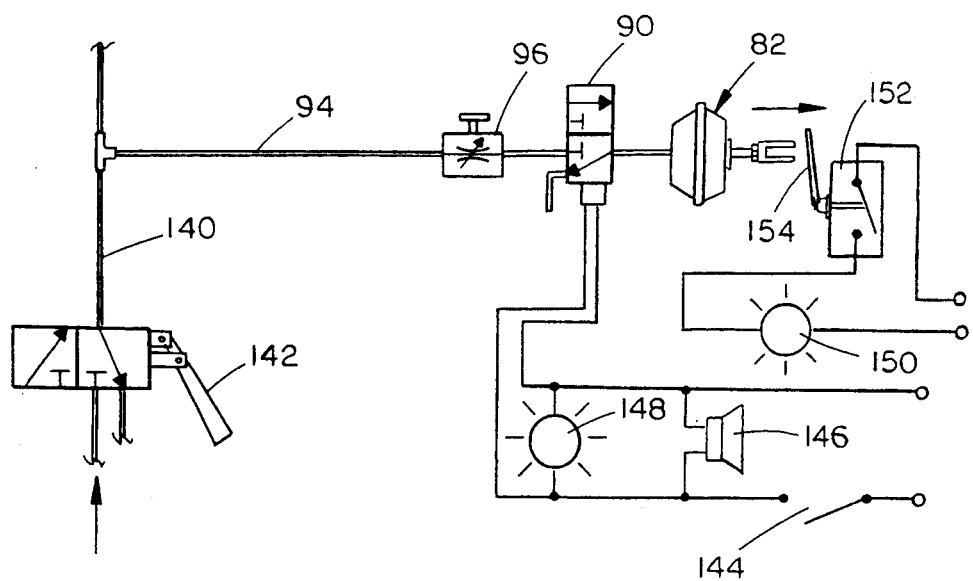
FIG. 7 is a schematic of the circuitry for the air powered actuator of this invention.

Link 72 includes an ear 132 extending therefrom. As seen in the drawings, link 72 extends between the arms 108 and 110. Ear 132 of link 72 is pivotally connected to the clevis 98 by means of the pin 134. Bracket 136 is bolted to frame member 36, as best illustrated in FIG. 4, to form a pivot point for the link 72 during the pin retraction and extension process. Preferably, an elongated flexible chain or cable 138 is connected to the outer end of link 72 to enable the locking pins 60 and 64 to be manually retracted if the need should arise. Referring to FIG. 7, it can be seen that air line 94 is connected to the air line 140 which is the air line for the air brakes for the tandem axle of the vehicle. Air to the air line 140 is controlled by the actuating arm 142 or control lever which is located in the cab of the vehicle. Air valve 90 is controlled by means of a switch 144 located in the cab of the vehicle. When switch 144 is closed, an audible alarm 146 is sounded and a visual signal light 148 is illuminated.

Light 150 is located on the trailer, in the cab of the truck, or at any convenient location as it is illuminated only when the locking pins 60 and 64 have been fully retracted. Light 150 is operatively connected to a conventional microswitch 152 having switch arm 154 movably extending therefrom. Microswitch 152 is normally open and is only closed when switch arm 154 is moved in a predetermined amount. Microswitch 152 is secured to the inner surface of arm 108 by bolts 156 and 158. Microswitch 152 is positioned on arm 108 so that switch arm 154 will not be deflected, so that microswitch 152 is in its normally open position, when rod 84 is in its retracted position. When rod 84 is extended to its fully extended position, which means that the locking pins 60 and 64 have been fully retracted, switch arm 154 is deflected by clevis 98 and pin 134 to close microswitch 152 which illuminates light 150 to indicate to the driver that the locking pins 60 and 64 are not fully retracted.

FIG. 4 illustrates the rod of cylinder 82 in its normal retracted position. When the rod of the cylinder 102 is in its retracted position, the links 68 and 72 are in the position illustrated in FIG. 4 so that the locking pins 60 and 64 are in their locked or extended position. At that time, pin 134 is located at the inner ends of the slots 112 and 114.

Figure 5:
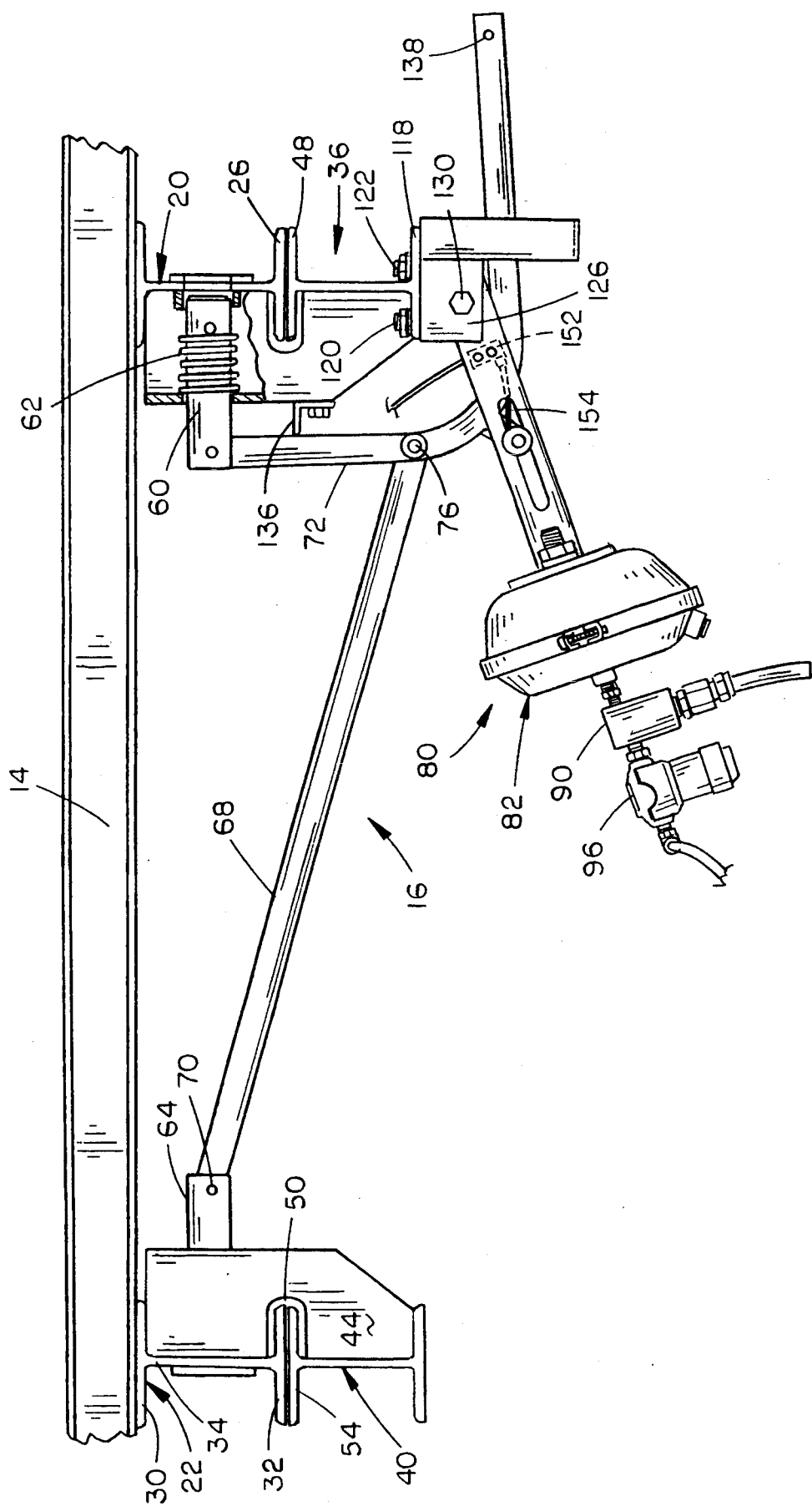
FIG. 5 is a view similar to FIG. 4 except that the locking pins have been retracted by the air powered actuator.
Figure 6:
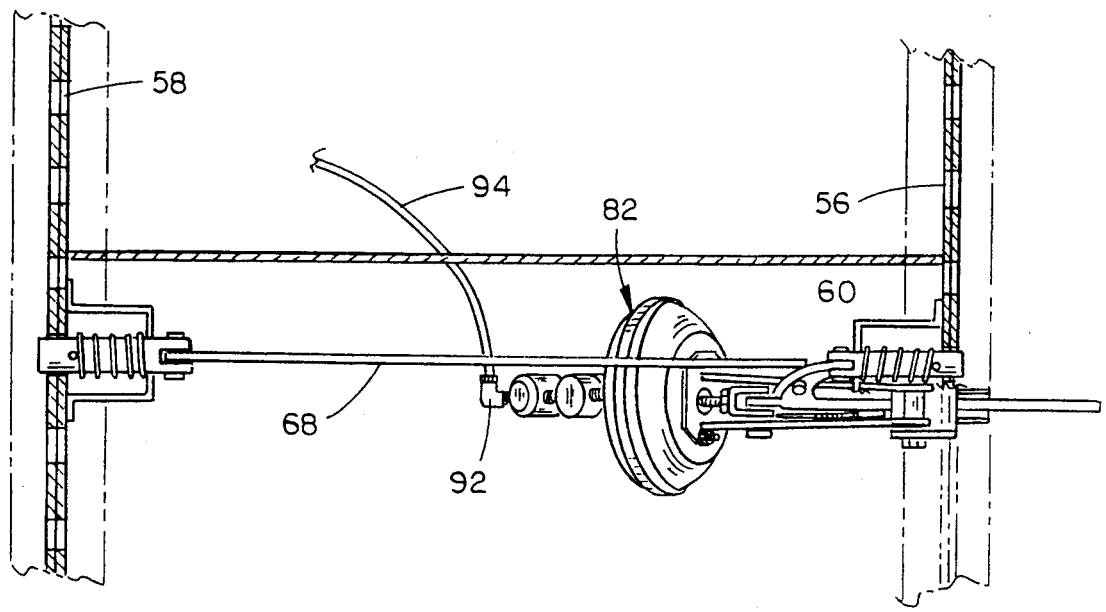
FIG. 6 is a partial top view of the air powered actuator of this invention and its relationship with respect to the slider assembly.

When it is desired to retract the locking pins 60 and 64 to enable the suspension of the trailer to be longitudinally moved with respect to the body of the trailer, air is supplied to the inlet side of the normally closed valve 90 by means of lever 142. Switch 144 is then closed by the operator to open valve 90 so that air is supplied to cylinder 82 so that rod 84 is extended therefrom. As rod 84 is extended from the cylinder 102, pin 134 is moved laterally outwardly in the slots 112 and 114. The outward movement of the pin 134 in the slots 112 and 114 causes the links 68 and 72 to be pivotally moved from the position of FIG. 4 to the position of FIG. 5. The movement of the links 68 and 72, from the position of FIG. 4 to the position of FIG. 5, causes the locking pins 60 and 64 to be moved from their extended positions to their retracted positions. At that time, with the tandem brakes being locked, the operator will move the trailer rearwardly or forwardly with respect to the locked tandem so that the trailer is longitudinally adjusted with respect to the tandem.

In the event that the locking pins 60 and 64 are completely stuck in their respective openings, due to some binding force thereon, the rod 84 may not be able to be extended by the pressure exerted in the pressure cylinder 82. That condition will be apparent to the operator since light 150 will not be illuminated. However, with air pressure being maintained in the cylinder 82, outward force or pressure is applied to the rod 82. The operator of the vehicle then slightly "jogs", "jiggles" or moves the trailer with respect to the tandem axle suspension. As soon as the trailer has been sufficiently moved to relieve the binding forces on the locking pins 60 and 64, the outward pressure being exerted on the rod 84 will cause the links 68 and 72 to move from the position of FIG. 4 to the position of FIG. 5 so that the locking pins 60 and 64 are retracted. At that time, light 150 will be illuminated.

When the locking pins 74 have been retracted and the trailer body moved longitudinally with respect to the slider, valve 90 is de-energized by switch 144 which causes valve 90 to be closed. As the valve 90 is closed, the air pressure within cylinder 82 is exhausted outwardly through the exhaust port 94 so that the springs 62 and 66 may urge the pins 60 and 64, respectively, into their extended and locked position.

Thus it can be seen that a novel air powered actuator has been provided for exerting sufficient force on the locking pins 60 and 64 to enable the locking pins to be moved to their retracted positions so that the suspension of the trailer may be adjusted as desired. The actuator of this invention may be operated from the cab of the vehicle without the necessity of a person standing at the side of the vehicle and exerting outward force on the link 72. Further, the air cylinder 82 exerts sufficient force to normally retract the locking pins regardless of the binding forces being applied to the locking pins. Additionally, the air powered actuator of this invention may be connected to the existing slider actuator mechanism without extensive modification thereof. Thus it can be seen that the invention accomplishes at least all of its stated objectives.

I claim:

1. A slider for adjustment of the suspension of a vehicle longitudinally with respect to the body of the vehicle, the slider comprising a pair of side rails adapted to be secured at the left and right sides of the body in a fixed position extending longitudinally of the body, and a frame adapted to carry the suspension comprising left and right slide members slidable longitudinally of the body on the side rails, first and second locking pins for locking the frame in various positions of adjustment relative to the side rails, said first and second locking pins being retractable for permitting adjustment of the frame to a selected position of adjustment and extensible for locking the frame in a selected position of adjustment, means for retracting said first and second locking pins including linkage interconnecting said first and second locking pins for conjoint movement of the locking pins between extended and retracted positions, spring means associated with said locking pins for yieldably urging said locking pins to their extended positions wherein the improvement comprises:
an air powered actuator means mounted on said slider including a movable actuator rod extending therefrom which is operatively secured to said linkage to effect retraction of said first and second locking pins;
a first elongated and arcuate link including opposite ends having one end thereof pivotally secured to said first locking pin and extending therefrom;
a second elongated link including opposite ends having one end thereof pivotally secured to said second locking pin;
said other end of said second link being pivotally secured to said first link intermediate the opposite ends of said first link;
said movable actuator rod being pivotally secured to said first link between the other end of said first link and its pivotal connection with said second link.

2. The slider of claim 1 wherein said first link extends downwardly from said first locking pin, thence laterally outwardly; and a pivot means on said slider beneath said one end of said first link which is in the pivotal path of said first link when said locking pins are being retracted by said air powered actuator.

3. The slider of claim 1 wherein said air powered actuator comprises a pressure cylinder having opposite sides, said actuator rod movably extending from one side of said cylinder, a first elongated bracket having one end secured to said one side of said pressure cylinder and extending therefrom, the other end of said first bracket being pivotally secured to said slider.

4. The slider of claim 3 wherein said first elongated bracket comprises first and second spaced-apart arms;
each of said arms having an elongated slot formed therein;
a pin movably mounted in said slots;
said actuator rod being pivotally secured to said pin.

5. The slider of claim 4 wherein said first link extends between said arms and wherein said first link is pivotally secured to said pin.

6. The slider of claim 1 including a light which is illuminated when said locking pins are in their retracted position.

7. The slider of claim 3 wherein an air valve is mounted at the other side of said pressure cylinder, said air valve being in communication with the source of air and being selectively controlled from the cab of the vehicle.

8. The slider of claim 7 wherein an air pressure regulator is also mounted at the other side of said pressure cylinder, said air pressure regulator being imposed between said pressure cylinder and the source of air.

9. The slider of claim 6 wherein said light is extinguished when said locking pins are moved into their extended positions.

* * * * *